UNITED STATES PATENT OFFICE.

STEPHEN A. TISDALE, OF LEOMINSTER, MASSACHUSETTS.

IMPROVEMENT IN PROCESSES OF TREATING HORN FOR THE MANUFACTURE OF COMBS.

Specification forming part of Letters Patent No. 192,095, dated June 19, 1877; application filed February 23, 1877.

*To all whom it may concern:*

Be it known that I, STEPHEN A. TISDALE, of Leominster, in the county of Worcester, in the State of Massachusetts, have invented a new and Improved Process of Treating Horn for the Manufacture of Combs, and declare the following to be a specification thereof.

Hitherto horn has been treated for this purpose in the following manner: After boiling in water and immersion for a short time in boiling tallow, the horn is spread open and inserted in the press, to be flattened between the press-irons. These press-irons have compartments, which serve as furnaces to contain a small charcoal fire. The irons thus heated are brought together by means of the screw, and compress the inclosed horn into a flat shape, and at the same time clarify the stock. After being thus treated the stock is cut into the desired shape, and the manufacture of the comb proceeds.

It is practically very difficult to keep these irons at a proper or even temperature, because the quantity of burning coal is small, and does not communicate to all parts of the press-iron the same degree of heat, by reason of which it often happens that some portions of the horn are insufficiently heated, and so remain unclarified, or other portions are heated too much, and are blistered, or even burned, whereby the stock becomes worthless. The fire, also, requires constant replenishing with fuel.

It is apparent that much skill and constant attention are necessary to maintain a proper and equable temperature of the irons.

The stock when treated in this manner is brittle, and has a tendency to curl, and when cut in a fine pattern is liable to crack or break.

My invention consists in the improved process of treating horn for the manufacture of combs and similar articles, as hereinafter described.

The cow's horn, for instance, is very rigid in character. In treating it for the purpose stated, the first operation is to cut off the tip. The horn is then split on one side, submerged for a while in boiling water, and afterward in melted tallow, which renders it pliable and capable of being opened by means of nippers inserted in the slit previously made in one side. It is now crowded down between the hot plates of the press-irons, which straighten the horn and make it flat.

The heat of the press-irons acts upon the natural oil which is contained in the horn in such a manner as to clarify it and render the horn—which was before opaque, rigid, and brittle—semi-transparent and pliable, so that it may be easily worked or cut in any desired shape without breaking or cracking.

The press-irons are steam-chests connected with the boiler by pipes. The steam cannot communicate an excessive degree of heat to the irons, and, filling all parts of the chest with equal pressure, imparts to all sides of the chest an even heat, which will not blister or burn the horn, and which clarifies it equally throughout. This kind of heat, being uniform and invariable, can be constantly kept and maintained without any care on the part of the pressman, and requires no skill or discretion of his, for which reasons an inferior class of workmen can obtain results hitherto not secured by skilled operatives.

The results of this process are uniform, and even if the stock is kept in the press too long it is nevertheless uninjured.

The horn treated by my process is remarkably tough, and can be worked in the finest patterns without breaking or cracking, and the comb-teeth especially exhibit a remarkable degree of elasticity.

Other advantages attending the use of my process are the greater amount of stock that can be gotten out in a given time, the operator not being obliged to replenish or otherwise attend to regulating the heat, as in the old process, but working continuously without this interruption, the saving of time in the first heating of the irons, and a large saving in fuel, the charcoal used for this purpose being of fine quality and from selected wood.

I thus obtain better results by my improved process, as to quantity, quality, and cost, than with the old process.

I therefore claim as a novel and useful invention, and desire to secure by Letters Patent—

The improved process of treating horn for the manufacture of combs, consisting in first cutting and splitting the horn as specified, then immersing it in boiling water, afterward in melted tallow, and finally pressing it between the plates of press-irons heated by steam, as and for the purpose set forth.

STEPHEN A. TISDALE.

Witnesses:
JOHN Q. EDGERLY,
FRANK A. JOY.